United States Patent [19]

David

[11] Patent Number: 5,012,587
[45] Date of Patent: May 7, 1991

[54] MACHINE FOR MEASURING BY COORDINATES

[75] Inventor: Jean-Marie David, Villeneuve D'Ascq, France

[73] Assignee: Renault Automation, Boulogne Billancourt, France

[21] Appl. No.: 587,610

[22] Filed: Sep. 24, 1990

Related U.S. Application Data

[63] Continuation of Ser. No. 314,037, Feb. 23, 1989, abandoned.

[30] Foreign Application Priority Data

Feb. 23, 1988 [FR] France .................... 88 02109

[51] Int. Cl.$^5$ .............................................. G01B 7/03
[52] U.S. Cl. ........................................ 33/503; 33/1 M; 33/556
[58] Field of Search ................ 33/1 M, 503, 556, 542, 33/558, 548, 549

[56] References Cited

U.S. PATENT DOCUMENTS

| 3,279,079 | 10/1966 | Schiler | 33/556 |
| 3,531,868 | 10/1970 | Stevenson | 33/503 |
| 3,750,295 | 8/1973 | Nordmann et al. | 33/548 |
| 4,364,178 | 12/1982 | Huet | 33/503 |
| 4,766,674 | 8/1988 | Zanier et al. | 33/1 M X |
| 4,780,961 | 11/1988 | Shelton et al. | 33/503 |
| 4,790,078 | 12/1988 | Schneider | 33/503 |
| 4,807,152 | 2/1989 | Lane et al. | 33/503 |

*Primary Examiner*—Daniel M. Yasich
*Attorney, Agent, or Firm*—Oblon, Spivak, McClelland, Maier & Neustadt

[57] ABSTRACT

Machine for measuring by coordinates having 1 to n measuring axes comprising a piece support and at least one carriage moving on a measuring axis, a sensing device equipping a carriage, characterized by the fact that each axis comprises a carrying structure (1, 2) and a metrological reference structure (11, 21) associated with position sensors (23, 24, 33), these two structures being connected by a connection member, said sensors determining the position of the reference structure of row n in relation to the reference structure of the measuring axis of row n−1.

3 Claims, 1 Drawing Sheet

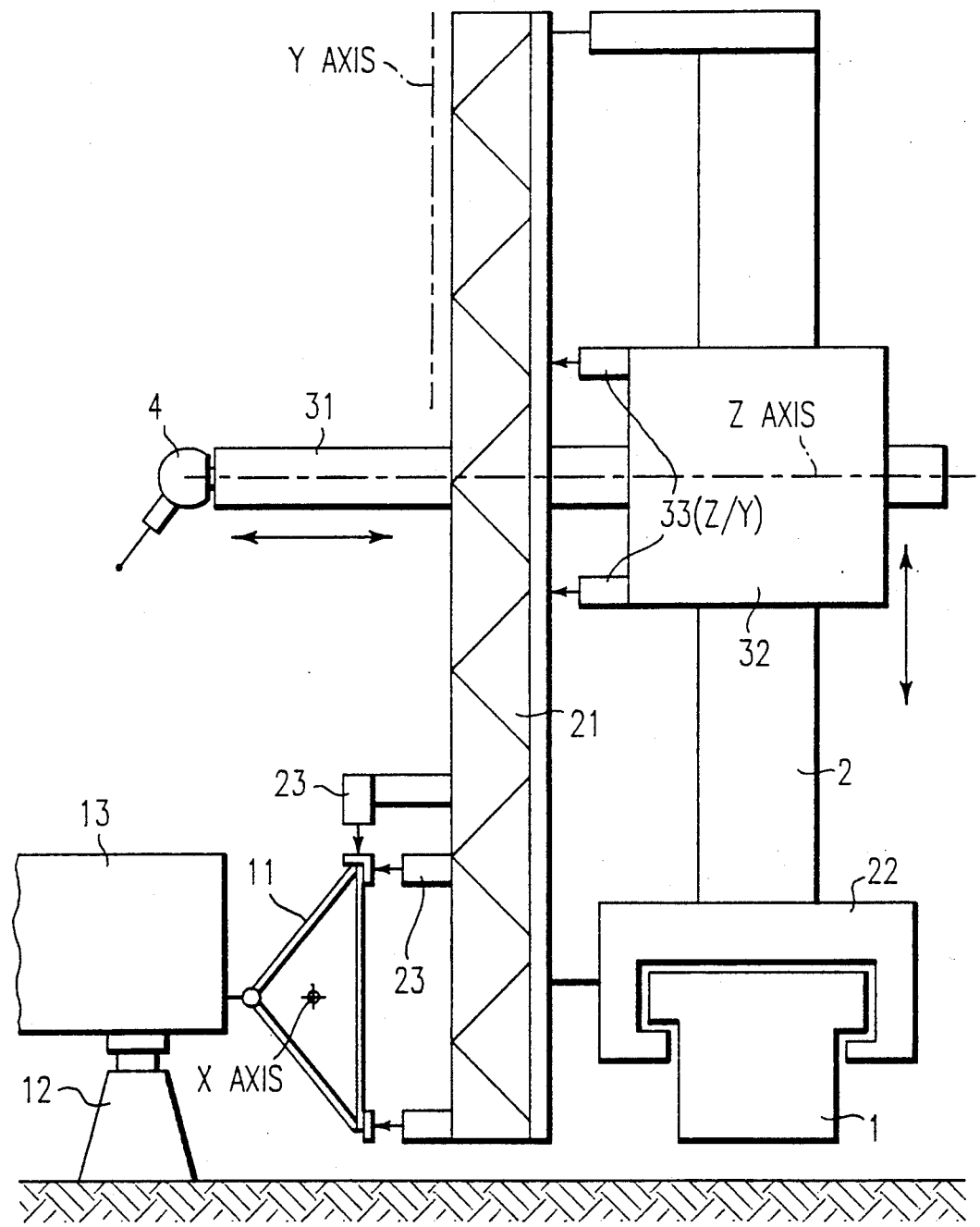

MACHINE FOR MEASURING BY COORDINATES

This application is a continuation of application Ser. No. 07/314,037, filed on Feb. 23, 1989, now abandoned.

BACKGROUND OF THE INVENTION

1. Field of the Invention:

This invention relates to a machine for measuring by coordinates having 1 to n measuring axes, comprising a piece support, at least one carriage moving on a measuring axis, and a sensing device equipping a carriage.

2. Discussion of the Background:

Machines of the above type generally comprise 3 measuring axes. The definition and the material configurations of one embodiment are given by French standard NF 11-150 and equivalent foreign documents. The elements of the slides of the machines which comprise a metrological reference simultaneously assure the support function of the piece and the slides, which cannot be performed without deformation.

SUMMARY OF THE INVENTION

This invention has the object of providing a machine with a separate carrying structure and metrological structure.

According to one characteristic, the metrological reference structure of the measuring axis of row 1 is connected to the support of the piece to be measured.

According to another characteristic, each carrying structure serves as a guide for a mobile carriage itself carrying a carrying structure.

According to further characteristic, for an axis, the machine comprises a sensor of movement along the measuring axis and five linear movement sensors making it possible to define the movements of the slide in relation to the reference structure.

According to yet additional characteristic, the position of the reference structure of row n, connected to the slide of row n, is determined in relation to the reference structure of row n−1 by a unit of six position sensors.

BRIEF DESCRIPTION OF THE DRAWINGS

The invention will now be described in more detail with reference to an embodiment given as an example and shown by the accompanying drawing in which:

The single FIGURE shows a measuring machine with horizontal arm according to the invention.

DESCRIPTION OF THE PREFERRED EMBODIMENT

Referring to the drawing, the machine comprises three measuring axes whose first axis X is horizontal, second axis Y is vertical and third axis Z is orthogonal to the first two.

Axis X comprises a metrological reference structure 11 and guide-carrying structure 1 on which moves a carriage or mobile slide 22.

Table support 13 of the work piece to be measured is connected to metrological reference structure 11 determining measuring axis X by a link member by an isostatic link support 13 and reference structure 11 are connected to one another by a connection member connection. The support 13 is fastened to the ground by a support structure 12.

Measuring axis Y comprises a metrological reference structure 21 and a guide-carrying structure 2 on which moves a carriage or mobile slide 32 and a metrological reference structure 21.

Carrying structure 2 of the Y axis moves on axis X by a carriage or mobile slide 22 on structure 1. Metrological reference structure 21 is connected to carrying structure 2 by a link 60. This structure 21 carries position sensors 23 sensing reference structure 11 of axis X. Horizontal arm 42 is mounted on a carriage 52 for movement along the 2 axis as shown in FIG. 1.

Carriage or slide 32 moves on the guide-carrying structure 2. It carries the components of axis Z along which moves the horizontal arm 42 itself carrying at its end the probing head 44. Carriage 32 carries six position sensors 33 sensing reference structure 21 relative to axis Y.

The position of each slide on its axis is completely determined by a set of six sensors in relation to the corresponding metrological reference structure:

one sensor giving the position of the slide along the measuring axis (linear or rotary depending on the situation).

five sensors of linear displacement (of comparator type) allowing them to define the small movements of the slide relatively to the reference structure according to the five other degrees of freedom. The sensors can be electronic comparators contacting the reference structure or noncontacting of any type.

All of the sensors are connected to appropriate electronic devices to take measurements when requested. The data from each sensor is transferred to a computer which is part of the machine and is used to compute the true coordinates of the probing head 44 taking into account the information given by the sensors and fixed dimensions of the machine.

Of course, without going outside the scope of the invention variants and improvements of details and likewise consideration of the use of equivalent means can be imagined.

Horizontal arm 42 is mounted on a carriage 52 for movement along the Z axis as shown in FIG. 1.

I claim:

1. A coordinate measuring apparatus, which comprises:

a plurality of coordinate measuring members located on a plurality of axes wherein a guide-carrying structure is positioned along one axis of said plurality of axes;

a carriage movably mounted on said guide-carrying structure;

a reference structure located separate from and spaced a predetermined distance from said carrying structure and connected to said carriage structure by link means;

at least one sensor attached to said carriage for determining the position of said carriage relative to said reference structure; and a workpiece support wherein the reference structure of a first measuring axis is connected to said workpiece support.

2. An apparatus according to claim 1, wherein a first sensor is positioned along said one axis for measuring the displacement of the carriage in the direction of said one axis and a plurality of additional sensors for measuring linear displacement are arranged so as to define the position of the carriage relative to the reference structure according to a plurality of degrees of freedom.

3. An apparatus according to claim 1, wherein the reference structure comprises a metal lattice which has a relatively small thermal expansion property.

* * * * *